(12) United States Patent
Madani et al.

(10) Patent No.: US 11,252,058 B2
(45) Date of Patent: Feb. 15, 2022

(54) SYSTEM AND METHOD FOR USER OPTIMIZED APPLICATION DEPENDENCY MAPPING

(71) Applicant: Cisco Technology, Inc., San Jose, CA (US)

(72) Inventors: Omid Madani, San Jose, CA (US); Ali Parandehgheibi, Sunnyvale, CA (US); Navindra Yadav, Cupertino, CA (US); Vimalkumar Jeyakumar, Sunnyvale, CA (US); Ellen Christine Scheib, Mountain View, CA (US); Mohammadreza Alizadeh Attar, Cambridge, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 555 days.

(21) Appl. No.: 15/140,365

(22) Filed: Apr. 27, 2016

(65) Prior Publication Data
US 2016/0359678 A1   Dec. 8, 2016

Related U.S. Application Data

(60) Provisional application No. 62/171,899, filed on Jun. 5, 2015.

(51) Int. Cl.
*G06F 3/00* (2006.01)
*G06F 9/00* (2006.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ....... H04L 43/045; H04L 69/16; H04L 45/38; H04L 43/0876; H04L 47/28;
(Continued)

(56) References Cited

U.S. PATENT DOCUMENTS

| 5,086,385 A | 2/1992 | Launey et al. |
| 5,319,754 A | 6/1994 | Meinecke et al. |

(Continued)

FOREIGN PATENT DOCUMENTS

| CN | 101093452 | 12/2007 |
| CN | 101770551 | 7/2010 |

(Continued)

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

(Continued)

*Primary Examiner* — Kieu D Vu
*Assistant Examiner* — Anita D Chaudhuri
(74) *Attorney, Agent, or Firm* — Polsinelli PC

(57) ABSTRACT

This disclosure generally relate to a method and system for mapping application dependency information. The present technology relates techniques that enable user-adjustable application dependency mapping of a network system. By collecting internal network data using various sensors in conjunction with external user inputs, the present technology can provide optimized application dependency mapping using user inputs.

17 Claims, 6 Drawing Sheets

(51) Int. Cl.

| | |
|---|---|
| G06F 17/00 | (2019.01) |
| H04L 12/26 | (2006.01) |
| H04L 29/06 | (2006.01) |
| G06F 9/455 | (2018.01) |
| G06N 20/00 | (2019.01) |
| G06F 21/55 | (2013.01) |
| G06F 21/56 | (2013.01) |
| G06F 16/28 | (2019.01) |
| G06F 16/2457 | (2019.01) |
| G06F 16/248 | (2019.01) |
| G06F 16/29 | (2019.01) |
| G06F 16/16 | (2019.01) |
| G06F 16/17 | (2019.01) |
| G06F 16/11 | (2019.01) |
| G06F 16/13 | (2019.01) |
| G06F 16/174 | (2019.01) |
| G06F 16/23 | (2019.01) |
| G06F 16/9535 | (2019.01) |
| G06N 99/00 | (2019.01) |
| H04L 9/32 | (2006.01) |
| H04L 12/24 | (2006.01) |
| H04L 12/715 | (2013.01) |
| H04L 12/723 | (2013.01) |
| H04L 29/08 | (2006.01) |
| H04L 12/851 | (2013.01) |
| H04W 84/18 | (2009.01) |
| G06F 21/53 | (2013.01) |
| G06F 3/0484 | (2022.01) |
| H04L 1/24 | (2006.01) |
| H04W 72/08 | (2009.01) |
| H04L 9/08 | (2006.01) |
| H04J 3/06 | (2006.01) |
| H04J 3/14 | (2006.01) |
| H04L 29/12 | (2006.01) |
| H04L 12/813 | (2013.01) |
| H04L 12/823 | (2013.01) |
| H04L 12/801 | (2013.01) |
| H04L 12/741 | (2013.01) |
| H04L 12/833 | (2013.01) |
| H04L 12/721 | (2013.01) |
| G06F 3/0482 | (2013.01) |
| G06T 11/20 | (2006.01) |
| H04L 12/841 | (2013.01) |
| H04L 12/725 | (2013.01) |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/235* (2019.01); *G06F 16/2322* (2019.01); *G06F 16/2365* (2019.01); *G06F 16/248* (2019.01); *G06F 16/24578* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/026* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/22* (2013.01)

(58) Field of Classification Search
CPC . H04L 47/2441; H04L 63/145; H04L 41/046; H04L 1/242; H04L 47/20; H04L 45/46; H04L 43/16; H04L 9/3242; H04L 45/66; H04L 43/0888; H04L 45/306; H04L 43/12; H04L 45/74; H04L 9/0866; H04L 9/3239; H04L 43/0841; H04L 41/22; H04L 43/0811; H04L 47/31; H04L 63/0876; H04L 61/2007; H04L 43/0805; H04L 47/2483; H04L 45/507; H04L 41/0668; H04L 67/1002; H04L 67/12; H04L 43/106; H04L 69/22; H04L 63/1408; H04L 47/11; H04L 63/16; H04L 43/062; H04L 43/0858; H04L 41/0816; H04L 41/0893; H04L 63/1416; H04L 63/06; H04L 43/02; H04L 43/0829; H04L 41/16; H04L 47/32; H04L 63/0227; H04L 63/1458; H04L 43/04; H04L 67/16; H04L 41/12; H04L 43/08; H04L 41/0803; H04L 63/1466; H04L 67/42; H04L 63/1433; H04L 67/10; H04L 43/10; H04L 43/0864;

H04L 43/0882; H04L 67/36; H04L 63/0263; H04L 41/0806; H04L 63/1441; H04L 63/1425; H04L 63/20; H04L 67/22; G06F 21/566; G06F 21/552; G06F 17/30598; G06F 21/53; G06F 17/30554; G06F 17/30604; G06F 17/30241; G06F 3/0482; G06F 17/30867; G06F 17/3053; G06F 3/04847; G06F 3/04842; G06F 9/45558; G06F 2221/2111; G06F 2221/2145; G06F 2221/2105; G06F 2221/2101; G06F 2221/033; G06F 2221/2115; G06F 2009/45591; G06F 2009/4557; G06F 2009/45595; G06F 2009/45587; G06N 99/005; H04W 84/18; H04W 72/08; H04J 3/14; H04J 3/0661; G06T 11/206

See application file for complete search history.

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,546,420 B1 | 4/2003 | Lemler et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |

(56) References Cited

U.S. PATENT DOCUMENTS

| | | |
|---|---|---|
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 6/2016 | Shimomura et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0220984 A1* | 11/2004 | Dudfield ............ H04L 41/0893 708/200 |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |

(56) References Cited

U.S. PATENT DOCUMENTS

| | | |
|---|---|---|
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1* | 3/2010 | Shah .............. H04L 45/00 370/389 |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1* | 6/2011 | Gvelesiani .......... G05B 19/0428 700/79 |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Meisen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1* | 5/2012 | Van Biljon .......... G06Q 30/04 709/226 |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |

(56) References Cited

U.S. PATENT DOCUMENTS

| | | |
|---|---|---|
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0335219 A1* | 12/2013 | Malkowski ............ G08B 13/22 340/539.22 |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0258310 A1* | 9/2014 | Wong ..................... G01C 21/20 707/749 |
| 2014/0269777 A1 | 9/2014 | Rothstein et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0297357 A1* | 10/2014 | Zeng ..................... G06Q 10/06 705/7.26 |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1* | 2/2015 | Degioanni ............ G06F 11/3495 715/734 |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0312233 A1 | 10/2015 | Graham, III et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |
| 2016/0269442 A1 | 9/2016 | Shieh |

(56) References Cited

U.S. PATENT DOCUMENTS

| | | |
|---|---|---|
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the 18$^{th}$ ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Cisco Systems, "Cisco Network Analysis Modules (NAM) Tutorial," Cisco Systems, Inc., Version 3.5.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

(56) References Cited

OTHER PUBLICATIONS

Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
InternetPerils, Inc., "Control Your Internet Business Risk," 2003-2015, https://www.internetperils.com.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "CANTINA: A Content-Based Approach to Detecting Phishing Web Sites," May 8-12, 2007, pp. 639-648.
Pathway Systems International Inc., "What is Blueprints?" 2010-2016, http://pathwaysystems.com/blueprints-about/.
Zhonghai Lu; Lei Xia; Jantsch, A., "Cluster-based Simulated Annealing for Mapping Cores onto 2D Mesh Networks on Chip," Design and Diagnostics of Electronic Circuits and Systems, 2008. DDECS 2008. 11th IEEE Workshop on , vol., No., pp. 1,6, Apr. 16-18, 2008.
Shneiderman, B.; Aris, A., "Network Visualization by Semantic Substrates," Visualization and Computer Graphics, IEEE Transactions on , vol. 12, No. 5, pp. 733,740, Sep.-Oct. 2006.
Bosch, Greg, "Virtualization," 2010, 33 pages.
Breen, Christopher, "Mac 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.

(56) References Cited

OTHER PUBLICATIONS

Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc.,"Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Voris, Jonathan, et al., "Bait and Snitch: Defending Computer Systems with Decoys," Columbia University Libraries, Department of Computer Science, 2013, pp. 1-25.
Arista Networks, Inc., "Application Visibility and Network Telemtry using Splunk," Arista White Paper, Nov. 2013, 11 pages.
Bauch, Petr, "Reader's Report of Master's Thesis, Analysis and Testing of Distributed NoSQL Datastore Riak," May 28, 2015, Brno. 2 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Duan, Yiheng, et al., Detective: Automatically Identify and Analyze Malware Processes in Forensic Scenarios via DLLs, IEEE ICC 2015—Next Generation Networking Symposium, pp. 5691-5696.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection," IEEE, 2004, pp. 599-612.
Thomas, R., "Bogon Dotted Decimal List," Version 7.0, Team Cymru NOC, Apr. 27, 2012, 5 pages.
Baek, Kwang-Hyun, et al., "Preventing Theft of Quality of Service on Open Platforms," 2005 Workshop of the $1^{st}$ International Conference on Security and Privacy for Emerging Areas in Communication Networks, 2005, 12 pages.
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Zeng, Sai, et al., "Managing Risk in Multi-node Automation of Endpoint Management," 2014 IEEE Network Operations and Management Symposium (NOMS), 2014, 6 pages.

\* cited by examiner

SYSTEM AND METHOD FOR USER OPTIMIZED APPLICATION DEPENDENCY MAPPING

CROSS-REFERENCE TO RELATED APPLICATION

This application claims priority to U.S. Provisional Application 62/171,899, titled "System for Monitoring and Managing Datacenters" and filed at Jun. 5, 2015, the disclosure of which is incorporated herein by reference in its entirety.

TECHNICAL FIELD

The disclosure relates generally to computer networks. More specifically, certain embodiments of the technology relate to a method and system for mapping application dependency information.

BACKGROUND

Network infrastructure management is important for business and organizations. To track application dependencies, IT management has relied on conventional techniques such as spreadsheets. But the proliferation of virtualized data centers and cloud services has made it increasingly difficult to track dependencies using traditional methods.

For example, traditional IT management technologies are unable to map individual application and specifically unable to discover which computing component supports each application. As businesses have attempted to utilize IT management systems for more complex business and application management, they have discovered that this is a very manual process, involving constant maintenance and complex programming.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
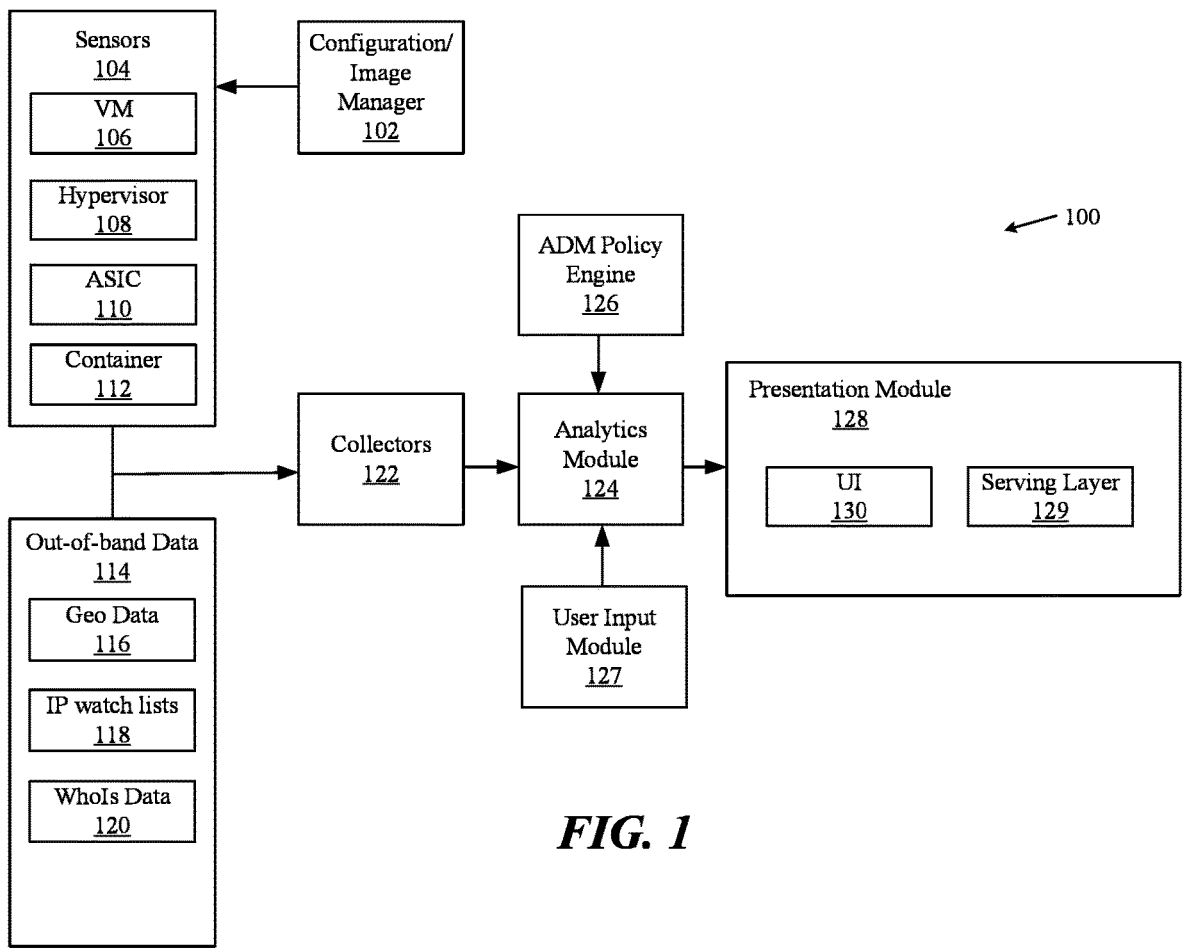
FIG. 1 illustrates a schematic block diagram of an application dependency mapping system, according to some embodiments.

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

Overview

Aspects of the present technology relate to techniques that enable user-adjustable application dependency mapping of a network system. By collecting internal network data using various sensors in conjunction with external user inputs, the present technology can provide user optimized application dependency mapping.

In accordance with one aspect of the present disclosure, a computer-implemented method is provided. The method includes receiving network data using a plurality of sensors associated with a plurality of nodes of a network, generating, based at least in part on the network data, a first application dependency map of an application executing in the network, the first dependency map representing an application network topology, receiving, via a user interface, an adjustment to an input parameter of the network, generating a second application dependency map of the application, the second dependency map representing an updated network topology, and displaying at least a portion of the second application dependency map.

According to some embodiments, the present technology can enable a system comprising: one or more processors, and memory including instructions that, upon being executed by the one or more processors, cause the system to receive network data using a plurality of sensors associated with a plurality of nodes of a network, the plurality of sensors including at least a first sensor of a physical switch, a second sensor of a hypervisor associated with the physical switch, and a third sensor of a virtual machine associated with the hypervisor, generate, based at least in part on the network data, a first clustering of the plurality of nodes, receive, via a user interface, an adjustment to an input parameter of the network, generate a second clustering of the plurality of nodes based at least in part on the adjustment, and display at least a portion of data related to the second clustering.

In accordance with another aspect of the present disclosure, a non-transitory computer-readable storage medium storing instructions is provided, the instructions which, when executed by a processor, cause the processor to perform operations including, receive network data using a plurality of sensors associated with a plurality of nodes of a network, generate, based at least in part on the network data, a first application dependency map of an application executing in the network, the first dependency map representing an application network topology, receive, via a user interface, an adjustment to an input parameter of the network, generate a second application dependency map of the application, the second dependency map representing an updated network topology, and display at least a portion of the second application dependency map.

Although many of the examples herein are described with reference to the application dependency mapping and discovery, it should be understood that these are only examples and the present technology is not limited in this regard. Rather, any other network information applications may be realized. Additionally, even though the present disclosure uses a sensor as a data-collecting device, the present technology is applicable to other controller or device that is capable of review, record and report network communication data between various end groups.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

FIG. 1 illustrates a schematic block diagram of an application dependency mapping system 100, according to some embodiments. Application dependency mapping system 100 can include, for example, configuration/image imaginer 102, sensors 104, collectors 122, analytics module 124, ADM policy engine 126, user input module 127 and presentation module 128. It should be appreciated that the system topology in FIG. 1 is an example, and any numbers of computing devices such as sensors, collectors, and network components may be included in the system of FIG. 1.

Configuration/image manager 102 can configure and manage sensors 104. For example, when a new virtual machine is instantiated or when an existing virtual machine is migrated, configuration/image manager 102 can provision and configure a new sensor on the virtual machine. According to some embodiments, configuration/image manager 102 can monitor the physical status or healthy of sensors 104. For example, configuration/image manager 102 might request status updates or initiate tests. According to some embodiments, configuration/image manager 102 also manages and provisions virtual machines.

According to some embodiments, configuration/image manager 102 can verify and validate sensors 104. For example, sensors 104 can be provisioned with a unique ID that is generated using a one-way hash function of its basic input/output system (BIOS) universally unique identifier (UUID) and a secret key stored on configuration and image manager 102. This unique ID can be a large number that is difficult for an imposter sensor to guess. According to some embodiments, configuration/image manager 102 can keep sensors 104 up to date by installing new versions of their software and applying patches. Configuration/image manager 102 can get these updates from a local source or automatically from a remote source via internet.

Sensors 104 can be associated with each node and component of a data center (e.g., virtual machine, hypervisor, slice, blade, switch, router, gateway, etc.). Sensors 104 can monitor communications to and from the component, report on environmental data related to the component (e.g., component IDs, statuses, etc.), and perform actions related to the component (e.g., shut down a process, block ports, redirect traffic, etc.). Sensors 104 can send their records over a high-bandwidth connection to the collectors 122 for storage.

Sensors 104 can comprise software codes (e.g., running on virtual machine 106, container 112, or hypervisor 108), an application-specific integrated circuit (ASIC 110, e.g., a component of a switch, gateway, router, or standalone packet monitor), or an independent unit (e.g., a device connected to a switch's monitoring port or a device connected in series along a main trunk of a datacenter). For clarity and simplicity in this description, the term "component" is used to denote a component of the network (i.e., a process, module, slice, blade, hypervisor, machine, switch, router, gateway, etc.). It should be understood that various software and hardware configurations can be used as sensors 104. Sensors 104 can be lightweight, minimally impeding normal traffic and compute resources in a datacenter. Software sensors 104 can "sniff" packets being sent over its host network interface card (NIC) or individual processes can be configured to report traffic to sensors 104.

According to some embodiments, sensors 104 reside on every virtual machine, hypervisor, switch, etc. This layered sensor structure allows for granular packet statistics and data collection at each hop of data transmission. In some embodiments, sensors 104 are not installed in certain places. For example, in a shared hosting environment, customers may have exclusive control of VMs, thus preventing network administrators from installing a sensor on those client-specific VMs.

As sensors 104 capture communications, they can continuously send network flow data to collectors 122. The network flow data can relate to a packet, collection of packets, flow, group of flows, open ports, port knocks, etc. The network flow data can also include other details such as the VM bios ID, sensor ID, associated process ID, associated process name, process user name, sensor private key, geo-location of sensor, environmental details, etc. The network flow data can comprise data describing the communication on all layers of the OSI model. For example, the network flow data can include Ethernet signal strength, source/destination MAC address, source/destination IP address, protocol, port number, encryption data, requesting process, a sample packet, etc.

Sensors 104 can preprocess network flow data before sending. For example, sensors 104 can remove extraneous or duplicative data or create a summary of the data (e.g., latency, packets and bytes sent per traffic flow, flagging abnormal activity, etc.). According to some embodiments, sensors 104 are configured to selectively capture certain types of connection information while disregarding the rest. Further, as it can be overwhelming for a system to capture every packet, sensors can be configured to capture only a representative sample of packets (for example, every 1,000th packet). According to some embodiments, sensors 104 can generate aggregate network flow data that has been subjected to processing, rendering it light-weighted for subsequent transmitting and processing.

According to some embodiments, sensors 104 can perform various actions with regard to the associated network component. For example, a sensor installed on a VM can close, quarantine, restart, or throttle a process executing on the VM. Sensors 104 can create and enforce policies (e.g., block access to ports, protocols, or addresses). According to some embodiments, sensors 104 receive instructions to perform such actions; alternatively, sensors 104 can act autonomously without external direction.

Sensors 104 can send network flow data to one or more collectors 122. Sensors 104 can be assigned to send network flow data to a primary collector and a secondary collector. In some embodiments, sensors 104 are not assigned a collector, but determine an optimal collector through a discovery process. Sensors 104 can change a destination for the report if its environment changes. For example, if a certain collector experiences failure or if a sensor is migrated to a new location that is close to a different collector. According to some embodiments, sensors 104 send different network flow data to different collectors. For example, sensors 104 can send a first report related to one type of process to a first collector, and send a second report related to another type of process to a second collector.

Collectors 122 can be any type of storage medium that can serve as a repository for the data recorded by the sensors. According to some embodiments, collectors 122 are directly connected to the top of rack (TOR) switch; alternatively, collectors 122 can be located near the end of row or elsewhere on or off premises. The placement of collectors 122 can be optimized according to various priorities such as network capacity, cost, and system responsiveness. According to some embodiments, data storage of collectors 122 is located in an in-memory database such as dash DB by IBM. This approach benefits from rapid random access speeds that typically are required for analytics software. Alternatively, collectors 122 can utilize solid state drives, disk drives, magnetic tape drives, or a combination of the foregoing according to cost, responsiveness, and size requirements. Collectors 122 can utilize various database structures such as a normalized relational database or NoSQL database.

According to some embodiments, collectors 122 serve as network storage for application dependency mapping system 100. Additionally, collectors 122 can organize, summarize, and preprocess the collected data. For example, collectors 122 can tabulate how often packets of certain sizes or types are transmitted from different virtual machines. Collectors 122 can also characterize the traffic flows going to and from various network components. According to some embodiments, collectors 122 can match packets based on sequence numbers, thus identifying traffic flows as well as connection links.

According to some embodiments, collectors 122 flag anomalous data. Because it would be inefficient to retain all data indefinitely, collectors 122 can routinely replace detailed network flow data with consolidated summaries. In this manner, collectors 122 can retain a complete dataset describing one period (e.g., the past minute), with a smaller report of another period (e.g., the previous), and progressively consolidated network flow data of other times (day, week, month, year, etc.). By organizing, summarizing, and preprocessing the data, collectors 122 can help application dependency mapping system 100 scale efficiently. Although collectors 122 are generally herein referred to as a plural noun, a single machine or cluster of machines are contemplated to be sufficient, especially for smaller datacenters. In some embodiments, collectors 122 serve as sensors 104 as well.

According to some embodiments, in addition to data from sensors 104, collectors 122 can receive other types of data. For example, collectors 122 can receive out-of-band data 114 that includes, for example, geolocation data 116, IP watch lists 118, and WhoIs data 120. Additional out-of-band data can include power status, temperature data, etc.

Configuration/image manager 102 can configure and manage sensors 104. When a new virtual machine is instantiated or when an existing one is migrated, configuration and image manager 102 can provision and configure a new sensor on the machine. In some embodiments configuration and image manager 102 can monitor the health of sensors 104. For example, configuration and image manager 102 might request status updates or initiate tests. In some embodiments, configuration and image manager 102 also manages and provisions virtual machines.

Analytics module 124 can accomplish various tasks in its analysis, some of which are herein disclosed. By processing data stored in various collectors 122, analytics module 124 can automatically generate an application dependency map, which depicts the physical and logical dependencies of the application components, as well as the dependencies of the components on the underlying infrastructure resources. The application dependency map can identify, for example, communication paths between the nodes, the ports used for communication (e.g., TCP ports), as well as the processes executing on the nodes. This map can be instructive when analytics module 124 attempts to determine the root cause of a failure (because failure of one component can cascade and cause failure of its dependent components) or when analytics module 124 attempts to predict what will happen if a component is taken offline. Additionally, analytics module 124 can associate edges of an application dependency map with expected latency, bandwidth, etc. for that individual edge.

For example, if component A routinely sends data to component B, but component B never sends data to component A, then analytics module 124 can determine that component B is dependent on component A, but A is likely not dependent on component B. If, however, component B also sends data to component A, then they are likely interdependent. These components can be processes, virtual machines, hypervisors, VLANs, etc. Once analytics module 124 has determined component dependencies, it can then form an application dependency map that represents the application network topology.

Similarly, using data provided from sensors 104, analytics module 124 can determine relationships between interdependent applications, analytics module 124 can determine what type of devices exist on the network (brand and model of switches, gateways, machines, etc.), where they are physically located (e.g., latitude and longitude, building, datacenter, room, row, rack, machine, etc.), how they are interconnected (10 Gb Ethernet, fiber-optic, etc.), and what the strength of each connection is (bandwidth, latency, etc.). Automatically determining the network topology can facilitate integrating of application dependency mapping system 100 within an established datacenter. Furthermore, analytics module 124 can detect changes of network topology without the needed of further configuration.

Analytics module 124 can establish patterns and norms for component behavior. Analytics module 124 can determine that certain processes (when functioning normally) will only send a certain amount of traffic to a certain VM using a small set of ports. Analytics module 124 can establish these norms by analyzing individual components or by analyzing data coming from similar components (e.g., VMs with similar configurations). Similarly, analytics module 124 can determine expectations for network operations. For example, it can determine the expected latency between two components, the expected throughput of a component, response time of a component, typical packet sizes, traffic flow signatures, etc. In some embodiments, analytics module 124 can combine its dependency map with pattern analysis to create reaction expectations. For example, if traffic increases with one component, other components may predictably increase traffic in response (or latency, compute time, etc.).

According to some embodiments, analytics module 124 uses machine learning techniques to identify which patterns are policy-compliant or unwanted or harmful. For example, a network administrator can indicate network states corresponding to an attack and network states corresponding to normal operation. Analytics module 124 can then analyze the data to determine which patterns most correlate with the network being in a complaint or non-compliant state. According to some embodiments, the network can operate within a trusted environment for a time so that analytics module 124 can establish baseline normalcy. According to some embodiments, analytics module 124 contains a database of norms and expectations for various components. This database can incorporate data from sources external to the network. Analytics module 124 can then create network security policies for how components can interact. According to some embodiments, when policies are determined external to system 100, analytics module 124 can detect the policies and incorporate them into this framework. A network administrator can manually tweak the network security policies. For example, network security policies can be dynamically changed and be conditional on events. These policies can be enforced on the components. ADM policy engine 126 can maintain these network security policies and receive user input to change the policies.

ADM policy engine 126 can configure analytics module 124 to establish what network security policies exist or should be maintained. For example, ADM policy engine 126 may specify that certain machines should not intercommunicate or that certain ports are restricted. A network policy controller can set the parameters of ADM policy engine 126. According to some embodiments, ADM policy engine 126 is accessible via presentation module 128.

According to some embodiments, analytics module 124 can determine similarity scores for the nodes, which indicate similarity levels among the plurality of nodes. Presentation module 128 can display the similarity scores on a user interface. Further, the system can generate node clusters based on the similarity levels of the node, e.g. nodes sharing a high similarity score (e.g., higher than a selected threshold) are associated with one node cluster.

Presentation module 128 can comprise serving layer 129 and user interface (UI) 130 that is operable to display, for example, information related to the application dependency map. As analytics module 124 analyzes the aggregate network flow data, they may not be in a human-readable form or they may be too large for an administrator to navigate. Presentation module 128 can take the network flow data generated by analytics module 124 and further summarize, filter, and organize the network flow data as well as create intuitive presentations of the network flow data.

Serving layer 129 can be the interface between presentation module 128 and analytics module 124. As analytics module 124 generates node attributes, serving layer 129 can summarize, filter, and organize the attributes that comes from analytics module 124. According to some embodiments, serving layer 129 can request raw data from a sensor, collector, or analytics module 124.

UI 130 can connect with serving layer 129 to present the data in a page for human presentation. For example, UI 130 can present the data in bar charts, core charts, tree maps, acyclic dependency maps, line graphs, tables, etc. UI 130 can be configured to allow a user to "drill down" on information sets to get a filtered data representation specific to the item the user wishes to "drill down" to. For example, individual traffic flows, components, etc. UI 130 can also be configured to allow a user to filter by search. This search filter can use natural language processing to determine analyze the network administrator's input. There can be options to view data relative to the current second, minute, hour, day, etc. UI 130 can allow a network administrator to view traffic flows, application dependency maps, network topology, etc.

According to some embodiments, UI 130 can receive inputs from a network administrator to adjust configurations in application dependency mapping system 100 or components of the datacenter. These instructions can be passed through serving layer 129, sent to configuration/image manager 102, or sent to analytics module 124.

After receiving an adjustment to an input parameter, analytics module 124 can generated an updated application dependency map using the adjusted parameters. For example, the user can remove or add a node from a selected node cluster and rerun the node clustering, or an application dependency mapping (ADM) pipeline. The user can define a period of time for generating the updated application dependency map, for example, Aug. 1, 2012-Aug. 14, 2012. The user can also create/name a new workspace, select nodes for generating the updated map, and upload side information, e.g., routs/subnets, load balancer information, for generating the map. Additionally, the user can, while adjusting part of the cluster parameters, approve or preserver certain cluster so that they are not subjected to re-runs.

Further, the user can adjust the clustering granularity, for example, via a knob or a selectable element on UI 130. The clustering granularity can generated a preferred number of node clusters. For example, a coarse-grained system with a low granularity comprises fewer clusters of nodes, whereas a fine-grained system with a higher granularity comprises more clusters of nodes.

With the updated application dependency mapping completed, the user can view network information on UI 130. For example, such information includes statistics of the network, number/name of the node clusters, port information related to nodes, comparison summary between the last ADM to the recent ADM.

Additionally, the various elements of application dependency mapping system 100 can exist in various configurations. For example, collectors 122 can be a component of sensors 104. In some embodiments, additional elements can share certain portion of computation to ease the load of analytics module 124.

Figure 2:
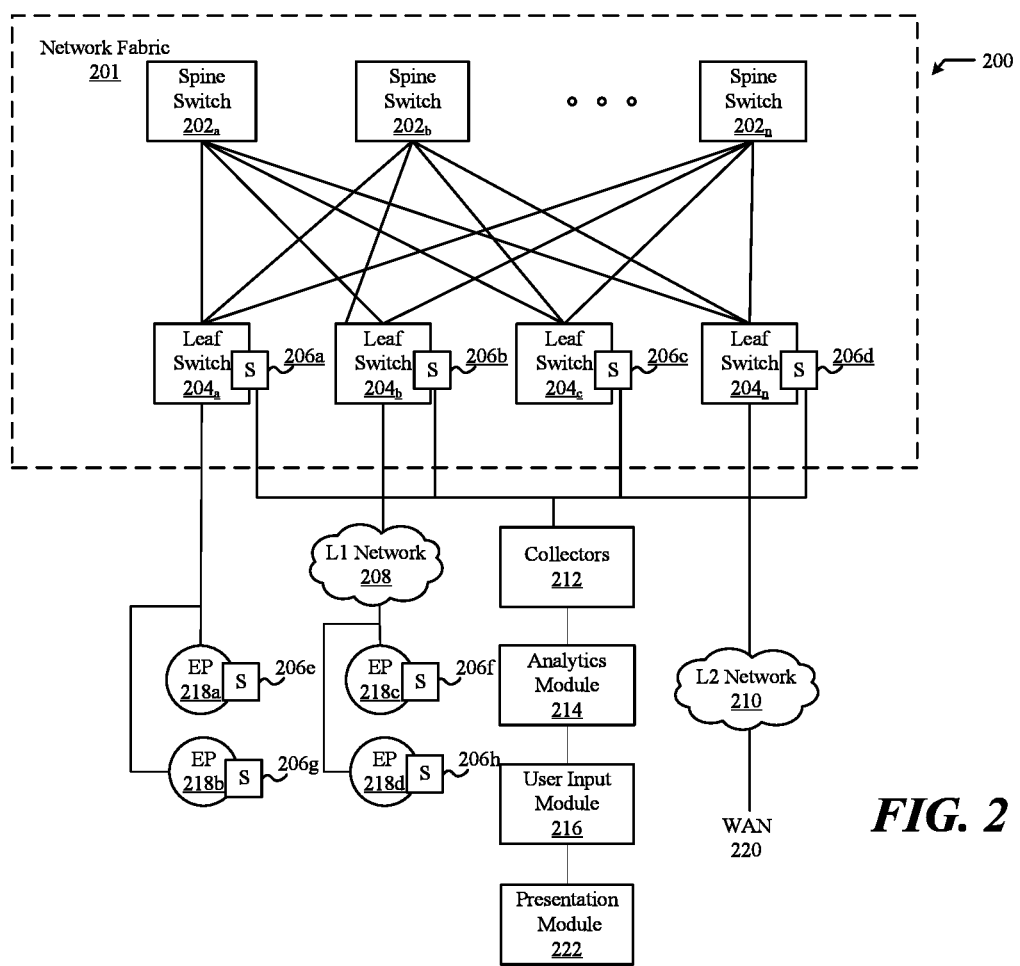
FIG. 2 illustrates an example of an application dependency mapping system adopting a leaf-spine architecture, according to some embodiments.

FIG. 2 illustrates an example of an application dependency mapping system 200 adopting a leaf-spine architecture, according to some embodiments. Network fabric 201 can include spine switches $202_a$, $202_b$, ..., $202_n$ (collectively, "202") connected to leaf switches $204_a$, $204_b$, $204_c$, ..., $204_n$ (collectively "204"). Leaf switches 204 can include access ports (or non-fabric ports) and fabric ports. Fabric ports can provide uplinks to the spine switches 202, while access ports can provide connectivity for devices, hosts, end points, VMs, or external networks to network fabric 201. Although a leaf-spine architecture is illustrated in network fabric 201, one of ordinary skill in the art will readily recognize that the subject technology can be implemented based on any network fabric, including any data center or cloud network fabric. Indeed, other architectures, designs, infrastructures, and variations are contemplated herein.

Spine switches 202 can support various capabilities, such as 40 or 10 Gbps Ethernet speeds. Spine switches 202 can include one or more 40 Gigabit Ethernet ports, each of which can also be split to support other speeds. For example, a 40 Gigabit Ethernet port can be split into four 10 Gigabit Ethernet ports.

Leaf switches 204 can reside at the edge of network fabric 201, thus representing the physical network edge. According to some embodiments, the leaf switches 204 can be top-of-rack switches configured according to a top-of-rack architecture. According to some embodiments, the leaf switches 204 can be aggregation switches in any particular topology, such as end-of-row or middle-of-row topologies. The leaf switches 204 can also represent aggregation switches.

Leaf switches 204 can be responsible for routing and/or bridging the tenant packets and applying network policies.

According to some embodiments, a leaf switch can perform one or more additional functions, such as implementing a mapping cache, sending packets to the proxy function when there is a miss in the cache, encapsulate packets, enforce ingress or egress policies, etc.

Network connectivity in network fabric 201 can flow through the leaf switches 204. For example, leaf switches 204 can provide servers, resources, endpoints, external networks, or VMs network access to network fabric 201. According to some embodiments, leaf switches 204 can connect one or more end point groups to network fabric 201 or any external networks. Each end point group can connect to network fabric 201 via one of leaf switches 204.

Endpoints $218_a$-$218_d$ (collectively "218") can connect to network fabric 201 via leaf switches 204. For example, endpoints $218_a$ and $218_b$ can connect directly to leaf switch 204A. On the other hand, endpoints 218 and $218_d$ can connect to leaf switch $204_b$ via L1 network 208. Similarly, wide area network (WAN) 220 can connect to leaf switches $204_n$ via L2 network 210.

Endpoints 218 can include any communication device or component, such as a node, computer, server, blade, hypervisor, virtual machine, container, process (e.g., running on a virtual machine), switch, router, gateway, etc. According to some embodiments, endpoints 218 can include a server, hypervisor, process, or switch configured with a VTEP functionality which connects an overlay network with network fabric 201. The overlay network can host physical devices, such as servers, applications, EPGs, virtual segments, virtual workloads, etc. In addition, endpoints 218 can host virtual workload(s), clusters, and applications or services, which can connect with network fabric 201 or any other device or network, including an external network. For example, one or more endpoints 218 can host, or connect to, a cluster of load balancers or an end point group of various applications.

Sensors $206_a$-$206_h$ (collectively "206) can be associated with each node and component of a data center (e.g., virtual machine, hypervisor, slice, blade, switch, router, gateway, etc.). As illustrated in FIG. 2, sensors 206 can be respectively associated with leaf switches 204 and endpoints 218. Sensors 206 can monitor communications to and from the component, report on environmental data related to the component (e.g., component IDs, statuses, etc.), and perform actions related to the component (e.g., shut down a process, block ports, redirect traffic, etc.). Sensors 206 can send these data to the collectors 212 for storage.

Sensors 206 can preprocess network flow data before sending. For example, sensors 206 can remove extraneous or duplicative data or create a summary of the data (e.g., latency, packets and bytes sent per traffic flow, flagging abnormal activity, etc.). According to some embodiments, sensors 206 are configured to selectively capture certain types of connection information while disregarding the rest. Further, as it can be overwhelming for a system to capture every packet, sensors can be configured to capture only a representative sample of packets (for example, every 1,000th packet).

According to some embodiments, sensors 206 can perform various actions with regard to the associated network component. For example, a sensor installed on a VM can close, quarantine, restart, or throttle a process executing on the VM. Sensors 206 can create and enforce security policies (e.g., block access to ports, protocols, or addresses). According to some embodiments, sensors 206 receive instructions to perform such actions; alternatively, sensors 104 can act autonomously without external direction.

Sensors 206 can send network flow data to one or more collectors 212. Sensors 206 can be assigned to send network flow data to a primary collector and a secondary collector. In some embodiments, sensors 206 are not assigned a collector, but determine an optimal collector through a discovery process. Sensors 206 can change a destination for the report if its environment changes. For example, if a certain collector experiences failure or if a sensor is migrated to a new location that is close to a different collector. According to some embodiments, sensors 206 send different network flow data to different collectors. For example, sensors 206 can send a first report related to one type of process to a first collector, and send a second report related to another type of process to a second collector.

Collectors 212 can be any type of storage medium that can serve as a repository for the data recorded by the sensors. Collectors 212 can be connected to network fabric 201 via one or more network interfaces. Collectors 212 can be located near the end of row or elsewhere on or off premises. The placement of collectors 212 can be optimized according to various priorities such as network capacity, cost, and system responsiveness. Although collectors 122 are generally herein referred to as a plural noun, a single machine or cluster of machines are contemplated to be sufficient, especially for smaller datacenters. In some embodiments, collectors 122 serve as sensors 202 as well.

According to some embodiments, collectors 212 serve as network storage for network flow data. Additionally, collectors 212 can organize, summarize, and preprocess the collected data. For example, collectors 212 can tabulate how often packets of certain sizes or types are transmitted from different virtual machines. Collectors 212 can also characterize the traffic flows going to and from various network components. According to some embodiments, collectors 212 can match packets based on sequence numbers, thus identifying traffic flows as well as connection links.

Analytics module 214 can automatically generate an application dependency map, which depicts the physical and logical dependencies of the application components, as well as the dependencies of the components on the underlying infrastructure resources. The application dependency map can identify, for example, communication paths between the nodes, the ports used for communication, as well as the processes executing on the nodes. This map can be instructive when analytics module 214 attempts to determine the root cause of a failure (because failure of one component can cascade and cause failure of its dependent components) or when analytics module 214 attempts to predict what will happen if a component is taken offline. Additionally, analytics module 214 can associate edges of an application dependency map with expected latency, bandwidth, etc. for that individual edge.

Similarly, using data provided from sensors 206, analytics module 214 can determine relationships between interdependent applications, analytics module 214 can determine what type of devices exist on the network (brand and model of switches, gateways, machines, etc.), where they are physically located (e.g., latitude and longitude, building, datacenter, room, row, rack, machine, etc.), how they are interconnected (10 Gb Ethernet, fiber-optic, etc.), and what the strength of each connection is (bandwidth, latency, etc.). Automatically determining the network topology can facilitate integrating of application dependency mapping system 200 within an established datacenter. Furthermore, analytics module 214 can detect changes of network topology without the needed of further configuration.

According to some embodiments, analytics module 214 can determine similarity scores for the nodes, which indicate similarity levels among the plurality of nodes. Presentation module 222 can display the similarity scores on a user interface. Further, the system can generate node clusters based on the similarity levels of the node, e.g. nodes sharing a high similarity score (e.g., higher than a selected threshold) are associated with one node cluster.

According to some embodiments, the application dependency mapping system can enable re-runs of application dependent mapping to implement various adjustments to the system. For example, a system administrator can make one or more adjustments, e.g. editing the size of the clusters, changing data-capturing time, to optimize the system performance. Analytics module 214 can compare the re-run data with the original data to summarize the recent adjustments, e.g. by matching the clusters with a matching algorithm. Additionally, presentation module 222 can display the summary of the changes on a user interface. This feature can help the administrator or user to track the implemented changes, make necessary adjustments, and improve system performance.

Figure 3:
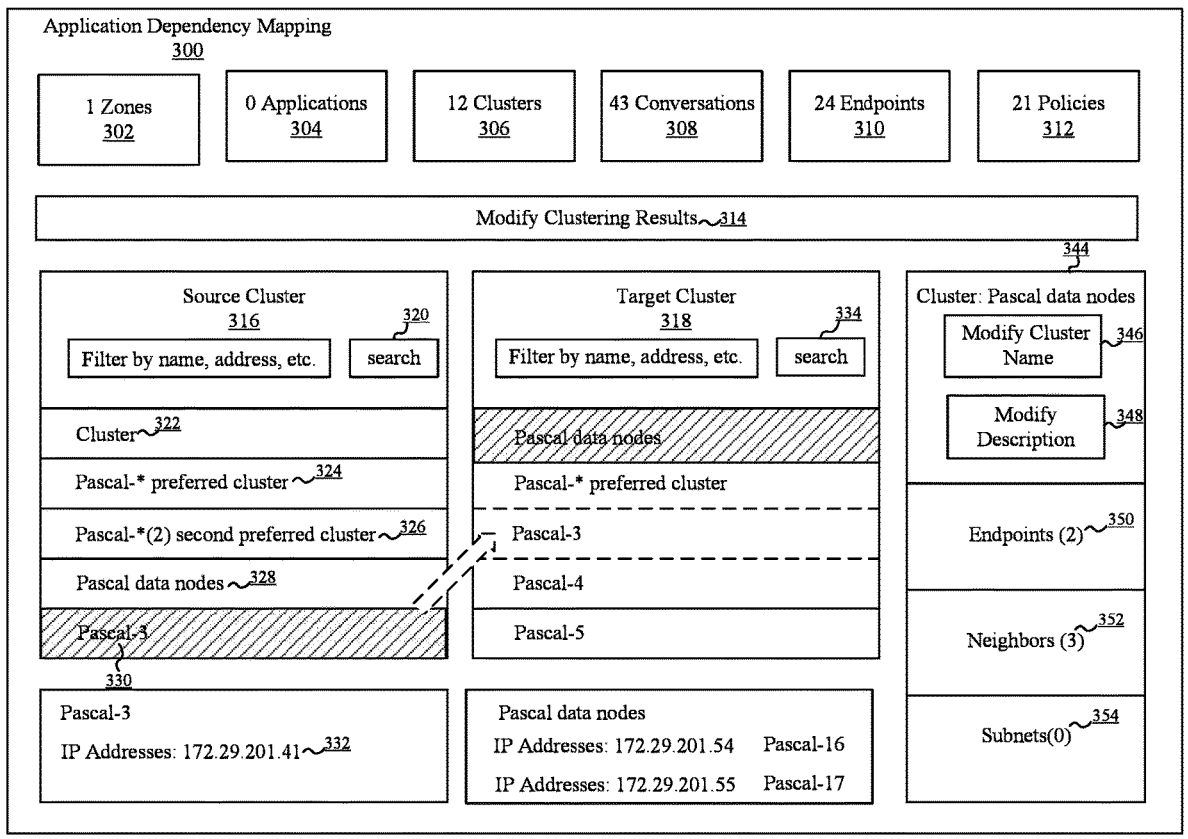
FIG. 3 illustrates an example of a user interface of an application dependency mapping system, according to some embodiments.

FIG. 3 illustrates an example of a user interface of an application dependency mapping system, according to some embodiments. It should be appreciated that the user interface in FIG. 3 is an example, and any other information sections may be included in FIG. 3.

Application dependent mapping 300 illustrates 1 zone 302 that include a number of nodes with 0 applications (304) executing on them. These nodes are divided to 12 clusters (306) having 43 conversations (308). There are 24 endpoints (310) having 21 policies (312).

As shown in FIG. 3, a network administrator or user can modify network input parameters via a selectable element such as modify clustering results 314. For example, source cluster 316 can include a number of nodes such as cluster 322, Pascal-* preferred cluster 324, Pascal-*(2) second preferred cluster 326, Pascal-data node 328, and Pascal-3 330. Target cluster 318 can originally include Pascal-4, Pascal-5. The user, after reviewing the automatically generated clustering nodes, can manually adjust the clustering, by removing or adding selected nodes to a cluster. For example, the user can move Pascal-* preferred cluster 324, Pascal-data node 328, and pascal-3 330 from source cluster 316 to target cluster 318.

As shown in FIG. 3, by selecting a specific node, the user can view detailed information related to it. In this example, the user selects to view Pascal-3 330, which is associated with IP Addresses: 172.29.201.41 (332). Similarly, Pascal-data node 328, which includes Pascal-16 and Pascal-17, is respectively associated with IP Addresses: 172.29.201.54 and IP Addresses: 172.29.201.55.

Source cluster 326 can include a search tab 320 to allow an administrator to "drill down" on information sets to get a filtered data representation. This search filter can use natural language processing to determine analyze the administrator's input. There can be options to view data relative to the current second, minute, hour, day, etc. Similarly, target cluster 318 can include a search tab 334 to perform similar functions.

When selecting Pascal data nodes 328, the user can modify network parameters related to this node cluster. For example, the user can modify the cluster's name via selecting modify cluster name tab 346, which enables the user to change the cluster name. The user can also modify node cluster description via selecting modify description tab 348, e.g. to define selected nodes for executing processes. Further, the user can edit parameters related to endpoints (2) 350 neighbors (3) 352 and subnets (0) 354.

Figure 4:
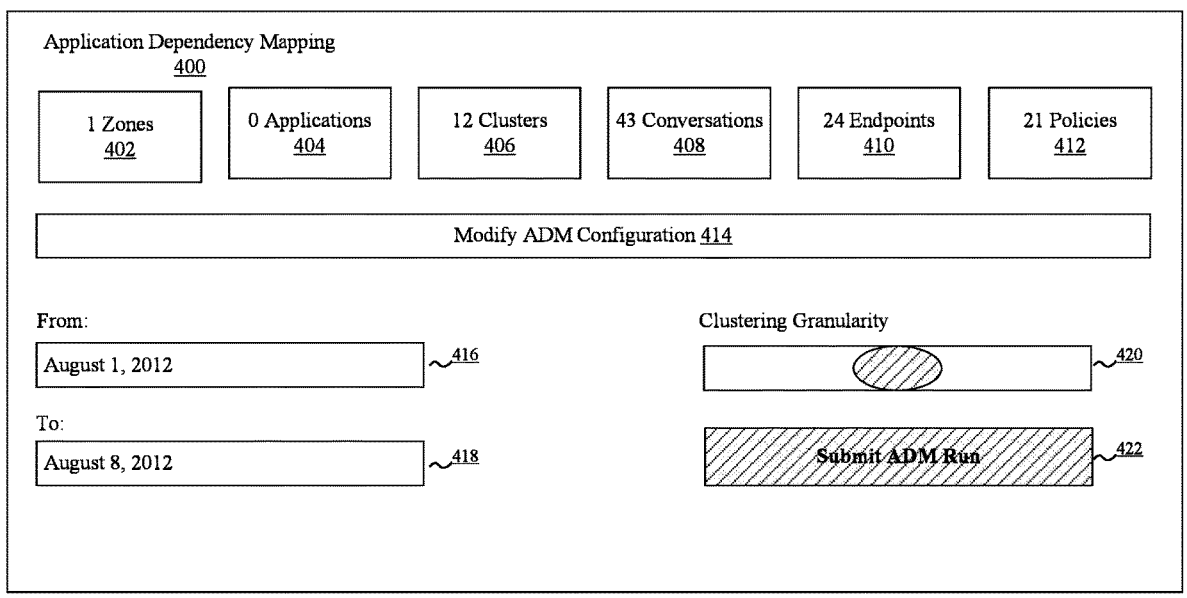
FIG. 4 illustrates another example of a user interface of an application dependency mapping system, according to some embodiments.

FIG. 4 illustrates an example of another user interface of an application dependency mapping system, according to some embodiments. Application dependent mapping 400 illustrates 1 zone (402) that include a number of nodes with 0 applications (404) executing on them. These nodes are divided to 12 clusters (406) having 43 conversations (408). There are 24 endpoints (410) having 21 policies (412). The modify ADM configuration tab 414 enables the user to modify network parameters.

The user can define a period of time for generating the updated application dependency map, for example, from a first time 416 to a second time 418 (e.g., Aug. 1, 2012-Aug. 8, 2012). The user can adjust the clustering granularity, for example, via a knob 420 or a selectable element, which can generate a preferred number of node clusters. For example, a coarse-grained system with a low granularity comprises fewer clusters of nodes, whereas a fine-grained system with a higher granularity comprises more clusters of nodes. Additionally, the user can also create/name a new workspace, select nodes for generating the updated map, and upload side information, e.g., routs/subnets, load balancer information, for generating the map. The user can, while adjusting part of the cluster parameters, approve or preserver certain cluster so that they are not subjected to re-runs.

After completing the adjustments, the user can select submit ADM run tab 422 for implementing the adjustments. With the ADM rerun completed, the user can view information including statistics of the network, number/name of the node clusters, port information related to nodes, comparison summary between the last ADM to the recent ADM. For example, to compare two ADMs, cluster statistics can be calculated to show 1) the number of clusters that is added, 2) the number of clusters that is removed, 3) the number of existing clusters that are modified, and 4) the number of clusters remain unchanged, etc.

Figure 5:
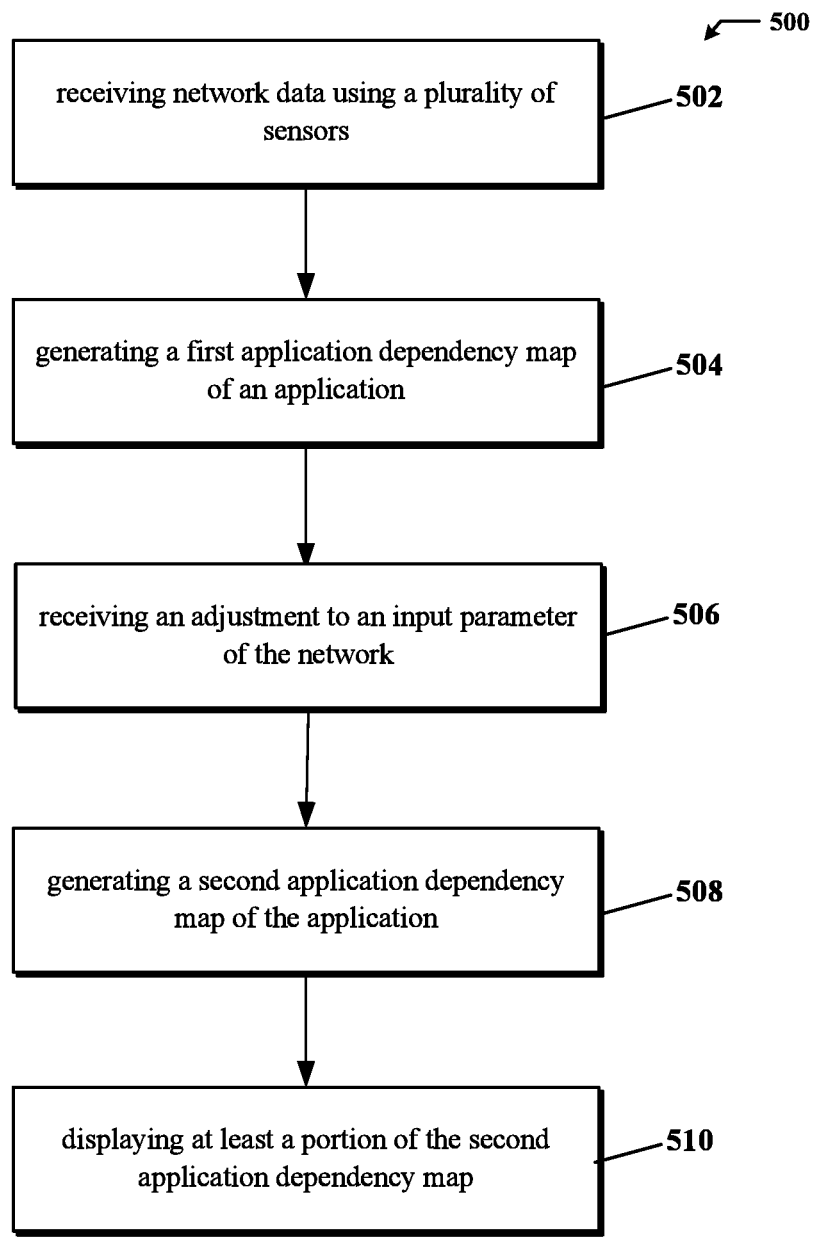
FIG. 5 is a flow diagram illustrating an example of a process for an application dependency mapping system, according to some embodiments.

FIG. 5 is a flow diagram illustrating an example of a process for an application dependency mapping system, according to some embodiments. It should be understood that there can be additional, fewer, or alternative steps performed in similar or alternative orders, or in parallel, within the scope of the various embodiments unless otherwise stated.

At step 502, an application dependency mapping system can receive receiving network data using a plurality of sensors associated with a plurality of nodes of a network. The plurality of sensors includes at least a first sensor of a physical switch of the network, a second sensor of a hypervisor associated with the physical switch, a third sensor of a virtual machine associated with the hypervisor. For example, as illustrated in FIG. 2, Sensors 206 can be associated with various nodes and components of a data center (e.g., virtual machine, hypervisor, slice, blade, switch, router, gateway, etc.). Sensors 206 can be respectively associated leaf switches, hypervisors, and virtual machines. Sensors 206 can monitor communications to and from the component, report on environmental data related to the component (e.g., component IDs, statuses, etc.), and perform actions related to the component (e.g., shut down a process, block ports, redirect traffic, etc.). As illustrated in FIG. 2, the system 200 can receive data packets sent from the first endpoint group associated with EP $218_a$ and destined for the second endpoint group associated with EP $218_d$.

At step 504, the application dependency mapping system can generate, based at least in part on the network data, a first application dependency map of an application executing in the network, the first dependency map representing an application network topology. For example, by analyzing aggregate network flow data, analytics module 214 can automatically generate an application dependency map, which can identify, for example, communication paths between the nodes, the ports used for communication, as well as the processes executing on the nodes. This map can be instructive when analytics module 214 attempts to determine the root cause of a failure (because failure of one component can cascade and cause failure of its dependent components) or when analytics module 214 attempts to predict what will happen if a component is taken offline. Additionally, analytics module 214 can associate edges of an application dependency map with expected latency, bandwidth, etc. for that individual edge.

According to some embodiments, analytics module 214 can determine similarity scores for the nodes, which indicate similarity levels among the plurality of nodes. Further, the system can generate node clusters based on the similarity levels of the node, e.g. nodes sharing a high similarity score (e.g., higher than a selected threshold) are associated with one node cluster.

Analytics module 214 can create network security policies for how components can interact. A network administrator can manually tweak the network security policies. For example, network security policies can be dynamically changed and be conditional on events. These policies can be enforced on the components. ADM policy engine can maintain these network security policies and receive user input to change the policies.

At step 506, the application dependency mapping system can receive, via a user interface, an adjustment to an input parameter of the network. For example, the user can remove or add a node from a selected node cluster and rerun the node clustering, or an application dependency mapping pipeline. The user can define a period of time for generating the updated application dependency map. The user can also create/name a new workspace, select nodes for generating the updated map, and upload side information, e.g., routs/ subnets, load balancer information, for generating the map. The user can also approve or preserve certain cluster so that they are not subjected to re-runs and consume system resources. For example, the system can receive a user approval for a clustering of nodes and prevent changes to the cluster of nodes in terms of node membership statuses.

At step 508, the application dependency mapping system can generate a second application dependency map of the application, the second dependency map representing an updated network topology. According to some embodiments, the application dependency mapping system can enable re-runs or revision of an application dependent mapping to implement various adjustments to the system.

At step 510, the application dependency mapping system can display at least a portion of the second application dependency map. For example, with the ADM rerun completed, the user can view information including statistics of the network, number/name of the node clusters, port information related to nodes, comparison summary between the last ADM to the recent ADM. Cluster statistics can include 1) the number of clusters that is added, 2) the number of clusters that is removed, 3) the number of existing clusters that are modified, and 4) the number of clusters remain unchanged, etc.

Figure 6A:
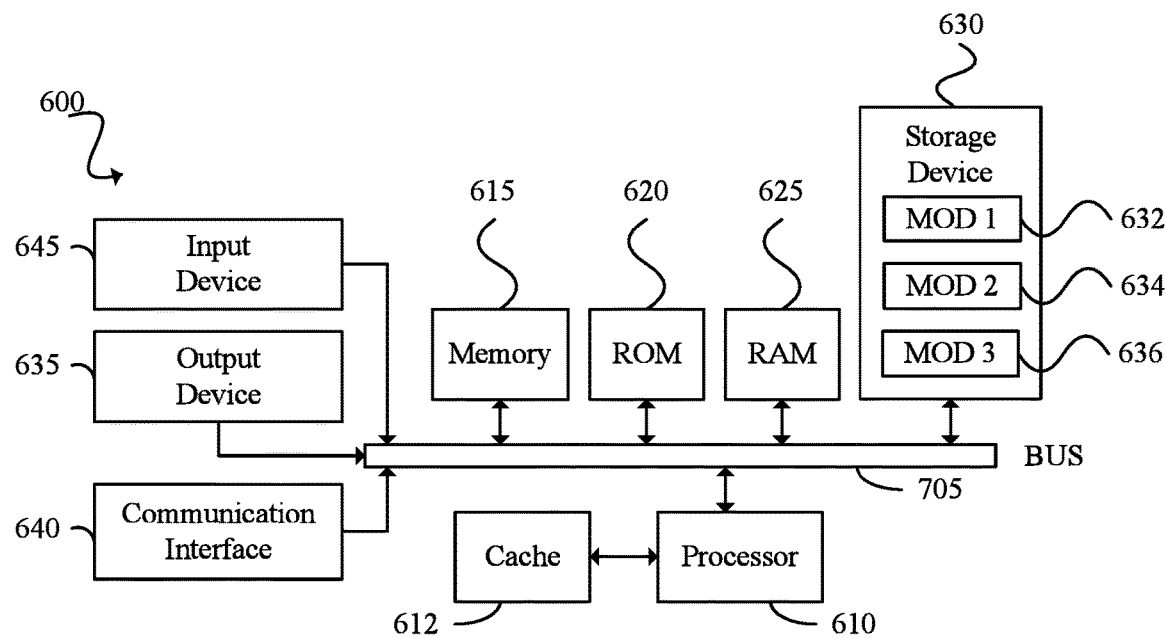
FIGS. 6A and 6B illustrate a computing platform of a computing device, according to some embodiments.
Figure 6B:
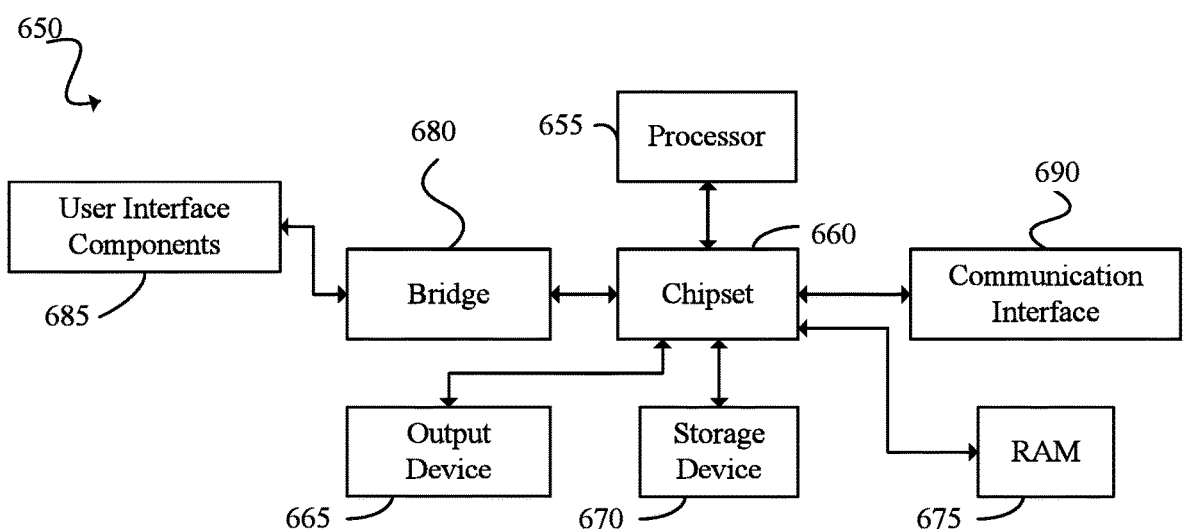

FIGS. 6A and 6B illustrate a computing platform of a computing device, according to some embodiments. FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
   receiving network data using a plurality of sensors associated with a plurality of nodes of a network;
   generating, based at least in part on the network data, a first application dependency map of an application executing in the network, the first application dependency map representing an application network topology;
   receiving, via a user interface, an adjustment to an input parameter of the network, the adjustment including a change to an original parameter used to generate the first application dependency map of the application;
   generating a second application dependency map of the application, the second application dependency map representing an updated network topology;
   determining a plurality of similarity scores, each of the plurality of similarity scores corresponding to one of the plurality of nodes and indicating a similarity level among the plurality of nodes;
   generating, based at least in part on the similarity level among the plurality of nodes, a clustering of the plurality of nodes to determine a node cluster;
   identifying changes between the first application dependency map and the second application dependency map based on the plurality of similarity scores by matching clusters including the node cluster within the plurality of nodes; and
   displaying, via the user interface, an indication of the changes between the first application dependency map and the second application dependency map and at least a portion of the second application dependency map.

2. The method of claim 1, wherein the application network topology identifies a plurality of communication paths between the plurality of nodes.

3. The method of claim 2, wherein the application network topology identifies a plurality of ports operable to communicate between the plurality of nodes, and a plurality of processes executing on the plurality of nodes.

4. The method of claim 1, wherein the adjustment comprises defining a period of time for generating the second application dependency map.

5. The method of claim 1, wherein the adjustment comprises selecting one or more nodes for generating the second application dependency map.

6. The method of claim 1, wherein the adjustment comprises uploading side information for generating the second application dependency map.

7. The method of claim 1, wherein the adjustment comprises selecting a specified clustering granularity.

8. The method of claim 1, wherein the adjustment comprises editing at least one of a name, a parameter, or a node membership status of a cluster of nodes.

9. The method of claim 8, further comprising:
receiving a user approval of one or more node membership statuses; and
preventing changes to the one or more node membership statuses while generating the second application dependency map.

10. The method of claim 1, wherein generating the first application dependency map comprises determining a first clustering of the plurality of nodes, and generating the second application dependency map comprises determining a second clustering of the plurality of nodes.

11. The method of claim 1, further comprising:
determining, based at least in part on the network data, at least one network policy for the network; and
storing the at least one network policy in a policy table.

12. A system comprising:
one or more processors;
a user interface; and
memory including instructions that, upon being executed by the one or more processors, cause the system to:
receive network data using a plurality of sensors associated with a plurality of nodes of a network, the plurality of sensors including at least a first sensor of a physical switch, a second sensor of a hypervisor associated with the physical switch, and a third sensor of a virtual machine associated with the hypervisor;
generate, based at least in part on the network data, a first clustering of the plurality of nodes;
receive, via the user interface, an adjustment to an input parameter of the network, the adjustment including a change to an original parameter used to generate the first clustering of the plurality of nodes;
generate a second clustering of the plurality of nodes based at least in part on the adjustment;
determine a plurality of similarity scores, each of the plurality of similarity scores corresponding to one of the plurality of nodes and indicating a similarity level among the plurality of nodes, wherein, the first clustering of the plurality of nodes is generated based at least in part on the plurality of similarity scores, and the second clustering of the plurality of nodes is generated based at least in part on the adjustment.
identify changes between the first clustering and the second clustering based on the plurality of similarity scores by matching clusters within the plurality of nodes; and
display, via the user interface, an indication of the changes between the first clustering and the second clustering and at least a portion of data related to the second clustering.

13. The system of claim 12, wherein the first clustering of the plurality of nodes comprises generating a first application dependency mapping representing an application network topology, and the second clustering of the plurality of nodes comprises generating a second application dependency mapping representing an updated application network topology.

14. The system of claim 13, wherein the application network topology identifies a plurality of communication paths between the plurality of nodes.

15. The system of claim 14, wherein the application network topology identifies a plurality of ports operable to communicate between the plurality of nodes, and a plurality of processes executing on the plurality of nodes.

16. The system of claim 12, further comprising:
determine, based at least in part on the network data, at least one network policy for the network; and
storing the at least one network policy in a policy table.

17. A non-transitory computer-readable storage medium having stored therein instructions that, upon being executed by a processor, cause the processor to:
receive network data using a plurality of sensors associated with a plurality of nodes of a network;
generate, based at least in part on the network data, a first application dependency map of an application executing in the network, the first application dependency map representing an application network topology;
receive, via a user interface, an adjustment to an input parameter of the network, the adjustment including a change to an original parameter used to generate the first application dependency map of the application;
generate a second application dependency map of the application, the second application dependency map representing an updated network topology;
determine a plurality of similarity scores, each of the plurality of similarity scores corresponding to one of the plurality of nodes and indicating a similarity level among the plurality of nodes, wherein the instructions upon being executed further cause the processor to:
generate, based at least in part on the similarity level among the plurality of nodes, a clustering of the plurality of nodes to determine a node cluster;
identify changes between the first application dependency map and the second application dependency map based on the plurality of similarity scores by matching clusters including the node cluster within the plurality of nodes; and
display, via the user interface, an indication of the changes between the first application dependency map and the second application dependency map and at least a portion of the second application dependency map.

* * * * *